US010183217B2

(12) United States Patent
Chen et al.

(10) Patent No.: US 10,183,217 B2
(45) Date of Patent: Jan. 22, 2019

(54) HAND-HELD CONTROLLER USING SEGMENTED CAPACITIVE TOUCH TRIGGER

(71) Applicant: Facebook Technologies, LLC, Menlo Park, CA (US)

(72) Inventors: Yi-Yaun Chen, Seattle, WA (US); Glen Jason Tompkins, Woodinville, WA (US); Bradley Morris Johnson, Edmonds, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/487,262

(22) Filed: Apr. 13, 2017

(65) Prior Publication Data
US 2018/0296913 A1 Oct. 18, 2018

(51) Int. Cl.
| | | |
|---|---|---|
| A63F 9/24 | (2006.01) |
| A63F 13/214 | (2014.01) |
| G06F 3/01 | (2006.01) |
| A63F 13/245 | (2014.01) |

(52) U.S. Cl.
CPC .......... *A63F 13/214* (2014.09); *A63F 13/245* (2014.09); *G06F 3/014* (2013.01); *A63F 2300/8082* (2013.01)

(58) Field of Classification Search
CPC ..... A63F 13/2145; A63F 13/40; A63F 13/245
See application file for complete search history.

(56) References Cited

U.S. PATENT DOCUMENTS

| | | | |
|---|---|---|---|
| 5,764,164 A | 6/1998 | Cartabiano et al. |
| 6,572,108 B1 | 6/2003 | Bristow |
| 8,570,273 B1 | 10/2013 | Smith |
| 2002/0171625 A1 | 11/2002 | Rothchild |
| 2004/0142749 A1* | 7/2004 | Ishimaru ................ A63F 13/06 |
| | | | 463/37 |
| 2005/0197205 A1 | 9/2005 | Hale, Jr. |
| 2007/0091070 A1* | 4/2007 | C. Larsen ............ G06F 3/0213 |
| | | | 345/168 |
| 2008/0042995 A1 | 2/2008 | Li et al. |
| 2009/0205878 A1* | 8/2009 | Taylor ................ G06F 3/03547 |
| | | | 178/18.03 |

(Continued)

FOREIGN PATENT DOCUMENTS

| | | |
|---|---|---|
| JP | 2004-227266 A | 8/2004 |
| WO | WO 2015/153690 A1 | 10/2015 |
| WO | WO 2016/140924 A1 | 9/2016 |

OTHER PUBLICATIONS

PCT International Search Report and Written Opinion, PCT Application No. PCT/US2017/031974, dated Jan. 2, 2018, 16 pages.

(Continued)

*Primary Examiner* — Steve Rowland
(74) *Attorney, Agent, or Firm* — Fenwick & West LLP

(57) ABSTRACT

A hand-held controller includes a handle extending in a longitudinal direction. The handle is shaped and dimensioned to be grasped by a user's hand. A trigger protrudes from an outer surface of the handle and moves relative to the handle responsive to pressing of the trigger by a finger of the user's hand. The trigger includes a touch surface that comes into contact with the finger of the user's hand to detect sliding of the finger of the user's hand on the touch surface.

20 Claims, 4 Drawing Sheets

(56) References Cited

U.S. PATENT DOCUMENTS

| | | |
|---|---|---|
| 2011/0037695 A1 | 2/2011 | Bor et al. |
| 2013/0178293 A1* | 7/2013 | Nakayama ............... A63F 13/98 463/38 |
| 2013/0215024 A1* | 8/2013 | Nakayama ............... G06F 3/033 345/157 |
| 2013/0324254 A1* | 12/2013 | Huang .................... G06F 3/016 463/37 |
| 2014/0018173 A1* | 1/2014 | Urhman ................ A63F 13/214 463/37 |
| 2015/0065090 A1 | 3/2015 | Yeh |
| 2015/0100204 A1* | 4/2015 | Gondo .................... G06F 3/016 701/36 |
| 2016/0179338 A1 | 6/2016 | Miller |
| 2016/0306422 A1 | 10/2016 | Parham et al. |
| 2016/0357261 A1 | 12/2016 | Bristol et al. |
| 2016/0363996 A1 | 12/2016 | Higgins et al. |
| 2016/0364910 A1 | 12/2016 | Higgins et al. |
| 2017/0003798 A1 | 1/2017 | Peng et al. |
| 2017/0131767 A1 | 5/2017 | Long |
| 2017/0151494 A1* | 6/2017 | Ironmonger ......... H01H 9/0214 |
| 2017/0329440 A1 | 11/2017 | Sturm et al. |

OTHER PUBLICATIONS

European Extended Search Report, European Application No. 17195995.0, dated Dec. 22, 2017, 7 pages.
PCT International Search Report and Written Opinion, PCT Application No. PCT/US2017/037608, dated Jan. 25, 2018, 15 pages.
PCT International Search Report and Written Opinion, PCT Application No. PCT/US2017/037638, dated Nov. 27, 2017, 12 pages.
European Extended Search Report, European Application No. 17202772.4, dated Jan. 26, 2018, 7 pages.
European Extended Search Report, European Application No. 17202777.3, dated Mar. 15, 2018, 8 pages.
PCT International Search Report and Written Opinion, PCT Application No. PCT/US2018/012207, dated Sep. 13, 2018, 13 pages.

* cited by examiner

HAND-HELD CONTROLLER USING SEGMENTED CAPACITIVE TOUCH TRIGGER

BACKGROUND

Field of the Disclosure

The present disclosure generally relates to virtual reality (VR) controllers, and specifically to a hand-held controller using a segmented capacitive touch trigger.

Description of the Related Arts

VR systems may include a controller to translate movement of the user's body into tangible action in a virtual world. Some controllers provide vibration feedback to Android or iOS VR headsets for motion-based gaming. A controller may be equipped with a gyroscope, an accelerometer, or terrestrial magnetic field sensor to trace motion back to a game, allowing intuitive gameplay as if the player is within the game.

SUMMARY

Embodiments relate to a hand-held controller to track a user's hand motion, position, natural gestures, and finger movement to create a sense of hand presence for more realistic and tactile VR. The controller may let the user make social gestures like point, wave, and give a thumbs-up or manipulate objects in the virtual space, pick up toys or fire laser guns with intuitive, natural hand movement.

In one embodiment, the hand-held controller includes a handle extending in a longitudinal direction. The handle is shaped and dimensioned to be grasped by a user's hand. A trigger protrudes from an outer surface of the handle and moves relative to the handle responsive to pressing of the trigger by a finger of the user's hand. The trigger includes a touch surface that comes into contact with the finger of the user's hand to detect sliding of the finger of the user's hand on the touch surface.

In one embodiment, the touch surface includes segmented tracks to generate distinct sensor signals indicating which of the segmented tracks come in contact with the finger.

In one embodiment, the hand-held controller includes a sensor interface circuit to receive the distinct sensor signals from the segmented tracks and process the distinct sensor signals to determine the sliding of the finger based on a sequence in which the distinct sensor signals indicate touching or disengaging of the finger and the segmented tracks.

In one embodiment, each of the segmented tracks is separated from a neighboring track by a spacing distance.

In one embodiment, each of the segmented tracks extends in a direction perpendicular to the longitudinal direction.

In one embodiment, the touch surface is a capacitive touch surface.

In one embodiment, the hand-held controller includes a ring attached to an end of the handle. The ring has an annular surface. The annular surface defines a plane that forms a predetermined angle with respect to the longitudinal direction.

In one embodiment, the handle has a cylindrical shape.

In one embodiment, the touch surface is made of plastic or glass.

In one embodiment, the handle is made of engineering plastic.

In one embodiment, the trigger detects pressing of the trigger by the finger of the user's hand.

In one embodiment, the hand-held controller includes a magnetic sensor embedded within the handle. The magnetic sensor detects a depth of motion of the trigger when the finger of the user's hand presses the trigger in a direction towards the handle.

In one embodiment, the magnetic sensor is a Hall Effect sensor, a fluxgate magnetometer, or a magnetoresistance sensor.

In one embodiment, the hand-held controller includes a wireless communication interface to transmit wireless signals representing the haptic input received from the touch surface.

BRIEF DESCRIPTION OF THE DRAWINGS

The teachings of the embodiments can be readily understood by considering the following detailed description in conjunction with the accompanying drawings.

The figures depict various embodiments for purposes of illustration only.

DETAILED DESCRIPTION

In the following description of embodiments, numerous specific details are set forth in order to provide more thorough understanding. However, note that the embodiments may be practiced without one or more of these specific details. In other instances, well-known features have not been described in detail to avoid unnecessarily complicating the description.

Embodiments are described herein with reference to the figures where like reference numbers indicate identical or functionally similar elements. Also in the figures, the left most digits of each reference number corresponds to the figure in which the reference number is first used.

Embodiments relate to a hand-held controller having a trigger with a touch surface to detect sliding of a finger on the trigger. The hand-held controller includes a handle extending in a longitudinal direction. The trigger protrudes from an outer surface of the handle and moves relative to the handle responsive to pressing of the trigger by the finger of the user's hand. The touch surface on the trigger comes into contact with the finger of the user's hand to detect sliding of the finger of the user's hand on the touch surface. The detected sliding of the finger may signal a computing device (e.g., a VR system) to take certain actions.

Figure 1:
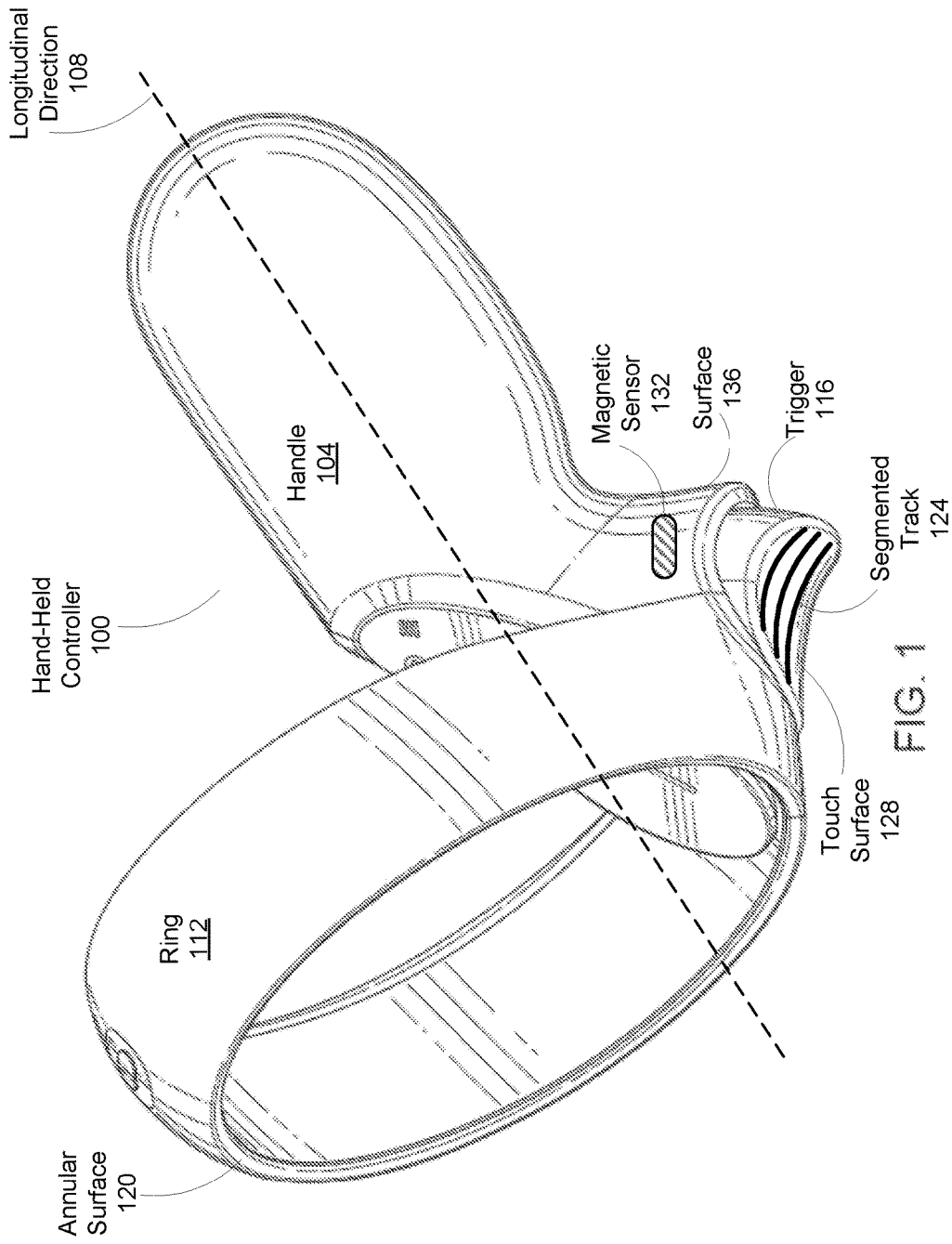
FIG. 1 is an example schematic perspective view of a hand-held controller, in accordance with an embodiment.

FIG. 1 is an example schematic perspective view of a hand-held controller 100, in accordance with an embodiment. The hand-held controller 100 may be included in a VR system as a stand-alone controller or as part of a pair of tracked controllers that give a user "hand presence"—the feeling that the user's virtual hands are actually his own. The hand-held controller 100 may enable the user to manipulate objects in a virtual space with precision and intuitive, natural hand movement.

The hand-held controller 100 includes a handle 104 extending in a longitudinal direction 108. The handle 104 may be made of an engineering plastic, such as injection-molded acrylonitrile butadiene styrene (ABS), polycarbonate, or polyamide (nylon). In embodiments, the handle 104 may be made of wood or metal. The handle 104 may be resistant to impact and abrasion. The material of the handle 104 may exhibit heat resistance, mechanical strength, or rigidity.

The handle 104 is shaped and dimensioned to be grasped by a user's hand for tracking natural gestures and finger movements to create more realistic and tactile VR. For example, the handle may have a cylindrical shape. The handle 104 of the hand-held controller 100 may bend or curve to balance the weight of the controller 100, such that it rests naturally in the top of the palm of the user or the crook of the user's fingers. The user may therefore comfortably hold the hand-held controller 100 without dropping it. Even if the user tries to open his hand completely when holding the hand-held controller 100 normally, the user's fingers may catch on the ring 112 and support the hand-held controller 100's weight. The ring 112 is attached to an end of the handle 104 and has an annular surface 120. The ring may be made of engineering plastic.

A trigger 116 made of plastic or rubber protrudes from an outer surface 136 of the handle 104. The trigger 116 moves relative to the handle 104 responsive to pressing of the trigger 116 by a finger of the user's hand. The trigger 116 includes a touch surface 128 that comes into contact with the finger of the user's hand to detect sliding of the finger of the user's hand on the touch surface 128. The touch surface 128 receives haptic input from a finger of the user's hand. The trigger 116 may have a tactile sensor to translate the motion and position of a user's fingers on the touch surface 128 to a relative position in a VR environment that is output to a computer screen or a head-mounted display (HMD). In an embodiment, the touch surface 128 is a capacitive touch surface. The touch surface 128 may operate by capacitive sensing, such as by sensing the capacitive virtual ground effect of the user's finger. The touch surface 128 may be made of glass, a glass-like polymer, plastic, or metal. In an embodiment, the capacitive touch pad 120 may be made of a flexible hydrogel embedded in silicone rubber.

The touch surface 128 of the trigger 116 includes segmented tracks 124. Each of the segmented tracks 124 extends in a direction perpendicular to the longitudinal direction 108. The hand-held controller 100 receives distinct sensor signals from the segmented tracks 124 to determine the sliding of the finger based on a sequence in which the distinct sensor signals indicate touching or disengaging of the finger and the segmented tracks 124, as illustrated and described in detail with reference to FIGS. 3 and 4.

The trigger 116 detects pressing of the trigger 116 by the finger of the user's hand. In an embodiment, the hand-held controller 100 includes a magnetic sensor 132 embedded within the handle 104. The magnetic sensor 132 detects a depth of motion of the trigger 116 when the finger of the user's hand presses the trigger 116 in a direction towards the handle 104. In embodiments, the magnetic sensor 132 may be a Hall Effect sensor, a fluxgate magnetometer, or a magnetoresistance sensor. A magnetic sensor 132 is a transducer that varies its voltage output in response to sensing a magnetic field. The depth of motion of the trigger 116 from the magnetic sensor 132 may be determined from a voltage output signal of the magnetic sensor 132 upon sensing a magnet embedded in or on the trigger 116.

Figure 2:
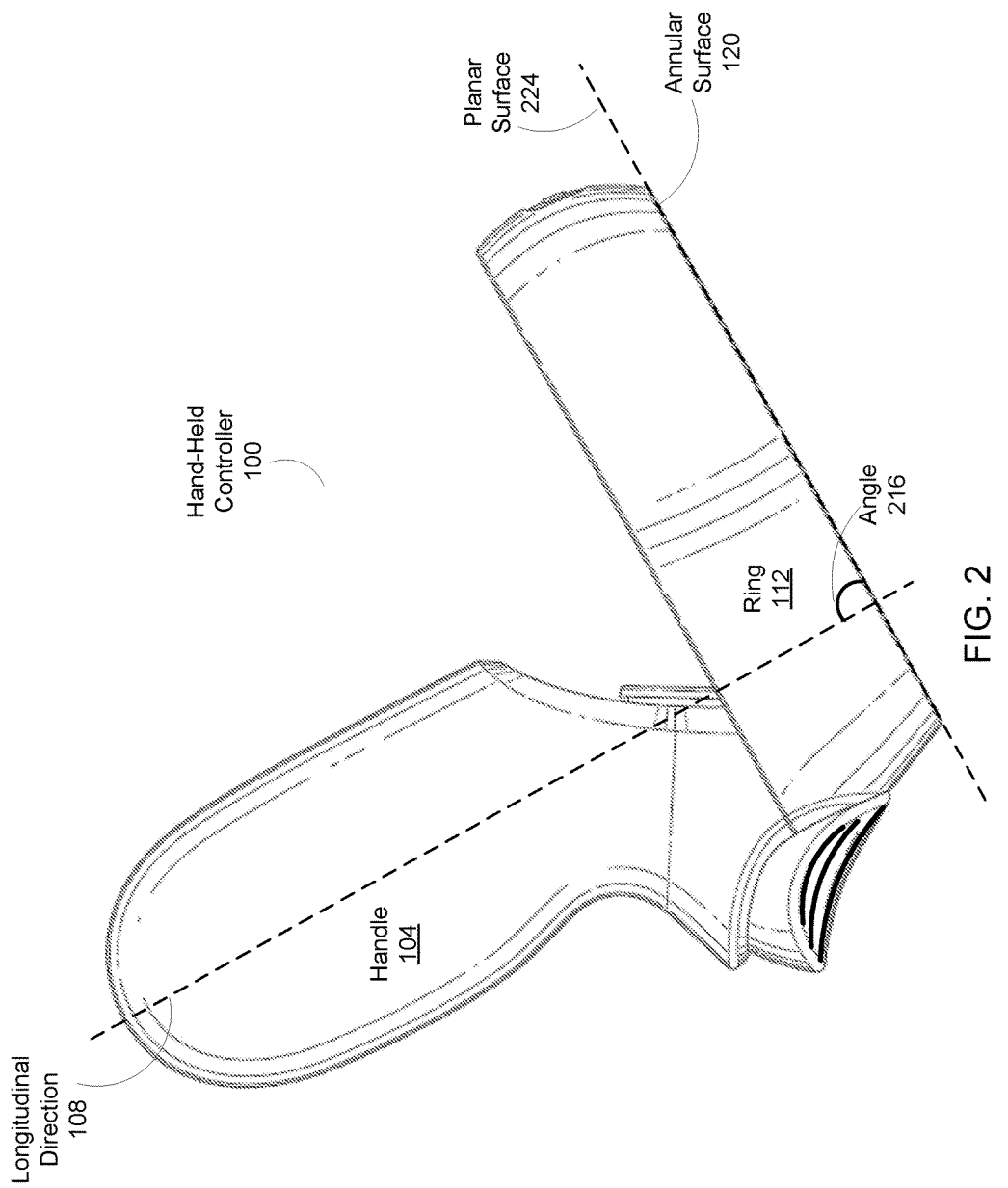
FIG. 2 is an example schematic side view of the hand-held controller, in accordance with an embodiment.

FIG. 2 is an example schematic side view of the hand-held controller 100, in accordance with an embodiment. The annular surface 120 of the ring 112, illustrated and described above with reference to FIG. 1, defines a plane 224 that forms a predetermined angle 216 with respect to the longitudinal direction 108 in which the handle 104 extends. The predetermined angle 216 may be between 45° to 135°. With the ring geometry illustrated in FIG. 2, if the predetermined angle 216 is more than 45°, this avoids interference with the thumb movement of the user. If the predetermined angle 216 is less than 135°, this avoids any affects to the inside-out tracking visibility to a camera mounted on an HMD.

Figure 3:
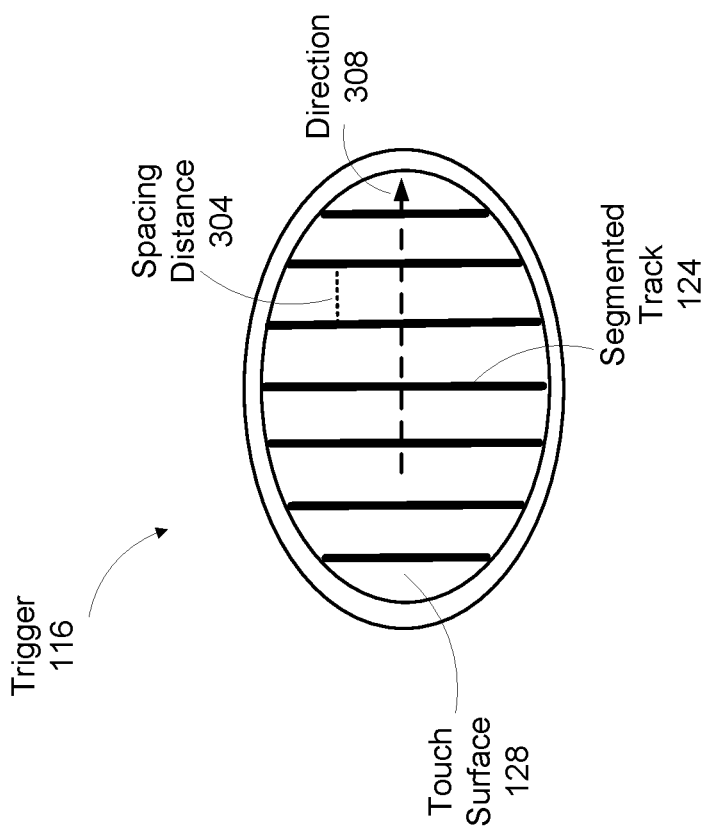
FIG. 3 is an example schematic view of the touch surface of the trigger, in accordance with an embodiment.

FIG. 3 is an example schematic view of the touch surface 128 of the trigger 116, in accordance with an embodiment. The touch surface 128 of the trigger 116 may have a circular or elliptical shape, as illustrated in FIG. 3.

Each of the segmented tracks 124 on the touch surface 128 is separated from a neighboring track by a spacing distance 304. The haptic input sensed by the touch surface 128 may include the finger of the user's hand touching the touch surface 128. The haptic input sensed by the touch surface 128 of the trigger 116 may include the finger of the user's hand moving across the touch surface 128. The haptic input sensed by the touch surface 128 may include the finger pressing the trigger 116.

In an embodiment, the touch surface 128 may be a multi-touch surface, meaning that the user may use two or more fingers to activate gesture-based commands via the touch surface 128. The touch surface 128 and its associated device driver software may interpret tapping the touch surface 128 as a "click." A tap on the touch surface 128 followed by a continuous pointing motion may indicate dragging.

The touch surface 128 may have "hotspots," that are locations on the touch surface 128 used for advanced functionality. For example, moving the user's finger along the segmented tracks 124 of the touch surface 128 in the direction 308 may act as a scroll wheel, such that a position of the user in a virtual environment moved from left to right. The touch surface 128 may also support two-finger dragging for scrolling. The touch surface 128's driver may support tap zones—regions where a tap will execute a function, for example, pausing a VR game or launching an application.

Figure 4:
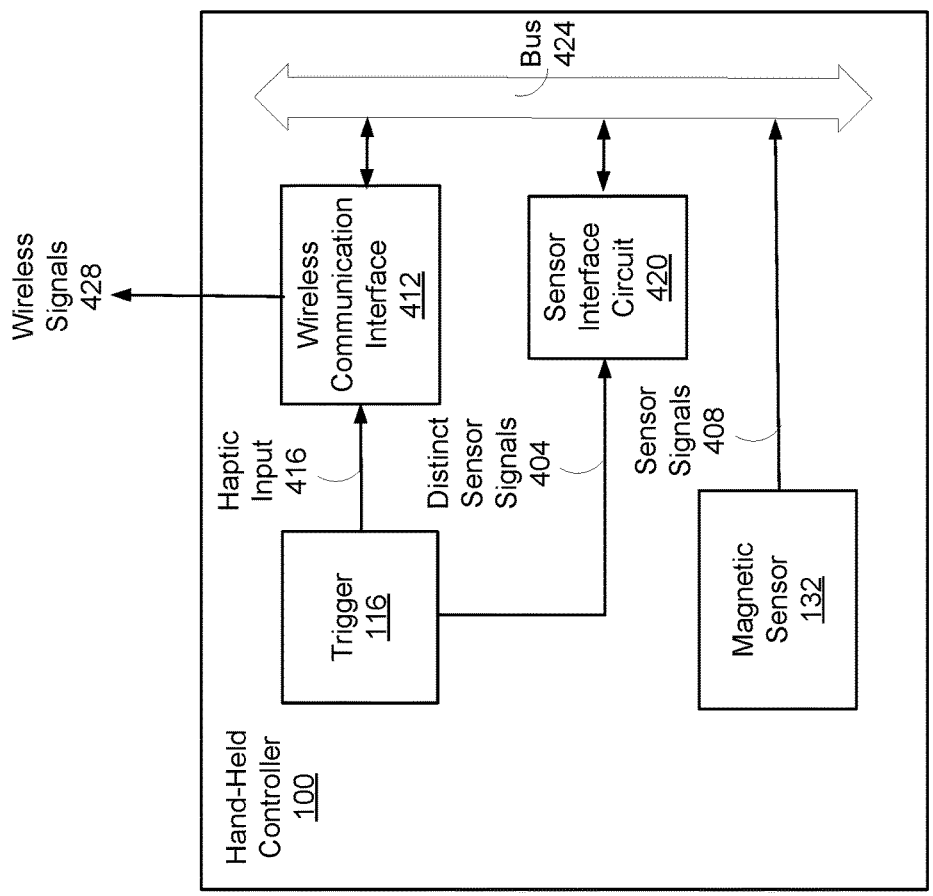
FIG. 4 is an example schematic block diagram of the hand-held controller, in accordance with an embodiment.

FIG. 4 is an example schematic block diagram of the hand-held controller 100, in accordance with an embodiment. The hand-held controller 100 includes the trigger 116, a wireless communication interface 412, a sensor interface circuit 420, a magnetic sensor 132 and a bus 424. In alternative configurations, different and/or additional components may be included in the hand-held controller 100, such as a memory, central processing unit (CPU), battery, Bluetooth component, USB input, etc.

The hand-held controller 100 may include a wireless communication interface 412, which may be a digital, analog, or mixed-signal circuit to transmit wireless signals 428 indicating haptic input 416 received from the touch surface 128 of the trigger 116. The wireless communication interface 412 may send and receive data via a wireless network without the need for connecting cables to the hand-held controller 100. In one embodiment, the wireless communication interface 412 may support the USB 1.1 and 802.11b wireless network standards up to 11 Mbps data transfer rates. In one embodiment, the wireless communication interface 412 may support the USB 2.0 and 802.11g standards up to 54 Mpbs data transfer rates. In one embodiment, the wireless communication interface 412 may be a Compact Flash (CF) wireless network adapter use infrared technology for data exchanges between the hand-held controller 100 and a computer, etc. The wireless signals 428 may be transmitted to a head-mounted display, a computer, a VR system, etc.

The touch surface 128 of the trigger 116 includes segmented tracks 124, which generate distinct sensor signals 404 indicating which of the segmented tracks 124 come in contact with the finger. The touch surface 128 may generate the distinct sensor signals 404 by detecting the electrical current of the user's finger as it comes into contact with a segmented track 124. The sensor interface circuit 420 receives the distinct sensor signals 404 from the segmented tracks 124 on the trigger 116 and processes the distinct sensor signals 404 to determine the sliding of the finger based on a sequence in which the distinct sensor signals indicate touching or disengaging of the finger and the segmented tracks 124.

In an embodiment, the magnetic sensor 132 generates sensor signals 408 representing the depth of motion of the trigger 116 when the finger of the user's hand presses the trigger 116 in a direction towards the handle 104, as illustrated and described above with reference to FIG. 1. In embodiments, the trigger 116 may be connected to a transducer that converts the mechanical motion of the trigger 116 into the sensor signals 408. The wireless communication interface 412, sensor interface circuit 420, and the magnetic sensor 132 may communicate via the bus 424.

The foregoing description of the embodiments has been presented for the purpose of illustration; it is not intended to be exhaustive or to limit the embodiments to the precise forms disclosed. Persons skilled in the relevant art can appreciate that many modifications and variations are possible in light of the above disclosure.

Finally, the language used in the specification has been principally selected for readability and instructional purposes, and it may not have been selected to delineate or circumscribe the inventive subject matter. It is therefore intended that the scope be limited not by this detailed description, but rather by any claims that issue on an application based hereon. Accordingly, the disclosure of the embodiments is intended to be illustrative, but not limiting, of the scope, which is set forth in the following claims.

What is claimed is:

1. A hand-held controller comprising:
   a handle extending in a longitudinal direction, the handle shaped and dimensioned to be grasped by a user's hand; and
   a trigger protruding from an outer surface of the handle and configured to move relative to the handle responsive to pressing of the trigger by a finger of the user's hand, the trigger comprising a touch surface configured to come into contact with the finger of the user's hand to detect sliding of the finger of the user's hand on the touch surface, wherein the touch surface comprises a plurality of segmented tracks configured to generate distinct sensor signals indicating which of the segmented tracks come in contact with the finger.

2. The hand-held controller of claim 1, further comprising a sensor interface circuit to receive the distinct sensor signals from the plurality of segmented tracks and process the distinct sensor signals to determine the sliding of the finger based on a sequence in which the distinct sensor signals indicate touching or disengaging of the finger and the segmented tracks.

3. The hand-held controller of claim 1, wherein each of the plurality of segmented tracks is separated from a neighboring track by a spacing distance.

4. The hand-held controller of claim 1, wherein each of the plurality of segmented tracks extends in a direction perpendicular to the longitudinal direction.

5. The hand-held controller of claim 1, wherein the touch surface is a capacitive touch surface.

6. The hand-held controller of claim 1, wherein the handle has a cylindrical shape.

7. The hand-held controller of claim 1, wherein the touch surface is made of plastic or glass.

8. The hand-held controller of claim 1, wherein the handle is made of engineering plastic.

9. The hand-held controller of claim 1, wherein the trigger is further configured to detect pressing of the trigger by the finger of the user's hand.

10. The hand-held controller of claim 1, further comprising a magnetic sensor embedded within the handle and configured to detect a depth of motion of the trigger when the finger of the user's hand presses the trigger in a direction towards the handle.

11. The hand-held controller of claim 10, wherein the magnetic sensor is a Hall Effect sensor, a fluxgate magnetometer, or a magnetoresistance sensor.

12. The hand-held controller of claim 1, further comprising a wireless communication interface configured to transmit wireless signals representing haptic input received from the touch surface.

13. A hand-held controller comprising:
    a handle extending in a longitudinal direction, the handle shaped and dimensioned to be grasped by a user's hand;
    a trigger protruding from an outer surface of the handle and configured to move relative to the handle responsive to pressing of the trigger by a finger of the user's hand, the trigger comprising a touch surface configured to come into contact with the finger of the user's hand to detect sliding of the finger of the user's hand on the touch surface; and
    a ring attached to an end of the handle and having an annular surface, the annular surface defining a plane that forms a predetermined angle with respect to the longitudinal direction.

14. The hand-held controller of claim 13, wherein the touch surface is segmented and each segment is configured to independently detect a presence of the finger.

15. The hand-held controller of claim 13, wherein the touch surface is a capacitive touch surface.

16. The hand-held controller of claim 13, wherein the handle has a cylindrical shape.

17. The hand-held controller of claim 13, wherein the touch surface is made of plastic or glass.

18. The hand-held controller of claim 13, wherein the trigger is further configured to detect pressing of the trigger by the finger of the user's hand.

19. The hand-held controller of claim 13, further comprising a magnetic sensor embedded within the handle and configured to detect a depth of motion of the trigger when the finger of the user's hand presses the trigger in a direction towards the handle.

20. The hand-held controller of claim 19, wherein the magnetic sensor is a Hall Effect sensor, a fluxgate magnetometer, or a magnetoresistance sensor.

* * * * *